United States Patent [19]

Gaffney et al.

[11] Patent Number: 5,026,532
[45] Date of Patent: Jun. 25, 1991

[54] PROCESS FOR THE PREPARATION OF AN IMPROVED CHABAZITE FOR THE PURIFICATION OF BULK GASES

[75] Inventors: Thomas R. Gaffney, Allentown; Charles G. Coe, Macungie, both of Pa.

[73] Assignee: Air Products and Chemicals, Inc., Allentown, Pa.

[21] Appl. No.: 334,642

[22] Filed: Apr. 6, 1989

[51] Int. Cl.$^5$ .............................................. C01B 33/34
[52] U.S. Cl. ...................................... 423/328; 55/75; 502/407
[58] Field of Search ...................... 423/328, 329, 330; 55/75; 502/407

[56] References Cited

FOREIGN PATENT DOCUMENTS 841812 7/1960 United Kingdom .

OTHER PUBLICATIONS

"Zeolite Molecular Sieves", D. W. Breck, John Wiley & Sons, New York, 1974.
"Role of Potassium in the Thermal Stability of CHA- and EAB-Type Zeolites," S. Cartlidge et al., Zeolites, vol. 4, p. 226, 1984.
"The Hydrothermal Chemistry of the Silicates, Part VII. Synthetic Potassium Aluminosilicates," R. M. Barrer et al., J. Chem. Soc., pp. 2882-2891 (1956).
"Chabazite Phase Crystallization in the Presence of Tetramethyl-Ammonium Ions," G. V. Tsitsishvili et al., Soobshcheniya Akademii nauk Bruzinskoi SSR, 97, No. 3, 1980, pp. 621-624.
"Solid State Transformations of Synthetic CHA-and EAB-Type Zeolites in the Sodium Form", S. Cartlidge et al., Zeolites, vol. 4, p. 218, (1984).
"The Role of Organic Molecules in Molecular Sieve Synthesis," Lok et al., Zeolites, vol. 3, p. 282, (1983).
"Synthesis and Crystal Growth of Zeolite ZSM-5 from Sodium Aluminosilicate Systems Free of Organic Templates", E. Narita, Ind. Eng. Chem. Prod. Res. Olev., 1985, 24, 507-512.

Primary Examiner—H. M. S. Sneed
Assistant Examiner—R. Bruce Breneman
Attorney, Agent, or Firm—Mark L. Rodgers; William F. Marsh; James C. Simmons

[57] ABSTRACT

A process is provided for preparing a synthetic chabazite having a Si/Al ratio of 1.8 to 2.3 by mixing an alumina source, sodium hydroxide, potassium hydroxide, a TMA reagent at a ratio of $(TMA)_2O:Al_2O_3$ of 0.08 to 0.0001, and a silica source to form a gel, crystallizing the gel by heating at a temperature of from about 25° to 150° C. for at least one hour, and separating the resulting chabazite product.

19 Claims, 5 Drawing Sheets

PROCESS FOR THE PREPARATION OF AN IMPROVED CHABAZITE FOR THE PURIFICATION OF BULK GASES

FIELD OF THE INVENTION

This invention relates to an improved scalable process for producing a preferred chabazite having improved properties over other zeolites, particularly for adsorption of weakly interacting adsorbates such as nitrogen.

BACKGROUND OF THE INVENTION

Recent requirements of the electronics industry for purer gases have increased interest in the use of zeolitic adsorbents for removing trace nitrogen from argon. Polyvalent chabazites have been disclosed as useful adsorbents for removing trace nitrogen from argon, for purifying methane, and for quantitatively separating oxygen from argon in chromatographic applications. The intrinsic properties of calcium-exchanged chabazites, realized only after proper dehydration, expand the range of contaminant gases which can be removed economically from bulk gases using standard adsorption techniques.

However, the availability of high-grade chabazite is extremely limited. Pure chabazite exists only rarely in nature and is too expensive to be used as a commercial adsorbent for large scale processes. In the invention herein, chabazite is meant to include a large number of synthetic zeolites having the chabazite topology and included under the general IUPAC structure code of chabazite (CHA). Synthetic analogues of chabazite are known. Examples include zeolites D, R, G, and ZK-14 (Breck, Zeolite Molecular Sieves, John Wiley and Sons, New York, N. Y., p 110 (1974) and Cartleidge, et al., Zeolites, 4, 226 (1984)). These phases could have minor variations in their crystal structure. Known methods for preparing synthetic chabazites having the preferred composition are not useful commercially since they suffer from low yields, poor product purity, long crystallization times, and difficult, if not impossible, scale-up. Before chabazite-based adsorbents can be exploited commercially, a synthetic method for preparing a pure chabazite by an economically attractive process is needed.

Some workers in the field have proposed methods for preparing synthetic chabazites. For example, Barrer, et al. describe the preparation of Zeolite G (J. Chem. Soc., 2882–2891 (1956) and J. S. C. Dalton, 1254–1259 (1972). The potassium form of these zeolites can be prepared from a variety of silica alumina sources which produce a number of phases of different composition ($SiO_2/Al_2O_3$ 1.0 to 4.5). However, such preparations only worked in very dilute gels and required up to several weeks to crystallize.

Zeolite R, a synthetic chabazite-like phase first prepared by Milton (British Patent No. 841,812 (1960)), only forms in the limited composition range of $SiO_2/Al_2O_3 = 3.44$ to 3.66. However, we have found that synthesis of zeolite R using methods taught by Milton is a kinetically controlled process which does not lend itself to scale-up. Because temperature, crystallization time, agitation, reagent source, and scale are important and even interdependent, it has not been possible to identify conditions under which such a method could be used to produce commercial quantities of pure synthetic chabazite reproducibly. Other methods of synthesis suffer similar problems on scale-up. For example, the method reported by Tsitsishvili, et al. (Soobshcheniya akademii nauk Gurzinoskoi SSR, 97, No 3, 621–624 (1980) produces chabazite contaminated with erionite and/or zeolite EAB when practiced on a large scale.

Another method for preparing synthetic chabazite designated ZK-14 is described by Cartleidge, et al. in Zeolites, 4, 218 (1984). This method is carried out in very dilute gels using high levels of tetramethylammonium hydroxide as a template, and produces low yields of zeolite per unit volume of reactor at high reagent cost.

While the tetramethylammonium cation (TMA) as discussed by Lok, et al. in The Role of Organic Molecules in Molecular Sieve Synthesis, Zeolites, 3, 282–291 (1983) is known to have structure-directing and gel chemistry-altering effects, it is nevertheless known to be poisonous as well as too costly for most commercial applications (See the discussion by Narita, Ind. Eng. Chem. Prod. Res. Dev., 24, 507–512 (1985)). It is, therefore, desirable to reduce the amount of TMA required to form chabazite.

There is no known method for producing commercially significant quantities of chabazite. Accordingly, a method for the rapid preparation of a nitrogen-adsorbing synthetic chabazite of the desired structure on a large scale in high yield from readily available starting materials is needed.

SUMMARY OF THE INVENTION

It has now been found that synthetic chabazites having a Si/Al ratio of 1.8 to 2.3 and improved adsorption properties over other zeolites for weakly interacting adsorbates such as nitrogen can be prepared rapidly, and in commercially significant quantities, by a process which comprises mixing an alumina source, sodium hydroxide, potassium hydroxide, a tetramethylammonium (TMA) reagent (hydroxide, salt, and/or hydrate), and a silica source in a suitable medium to form a gel in which the ratio of $(TMA)_2O:Al_2O_3$ is 0.08 to 0.0001, crystallizing the gel by heating and, preferably, separating the chabazite product from the crystallization mixture. Preferably, the gel is crystallized by heating at a temperature of from about 25° to 150° C. for at least one hour.

The chabazite of the invention can then be converted into the divalent form by replacing its monovalent ions with divalent ions. Preferably, at least a majority (more than fifty percent) of the monovalent ions of the chabazite product of the invention are replaced by any desired divalent ions, preferably calcium or strontium, most preferably calcium.

The resulting chabazite can then be dehydrated by any method that will remove water from the zeolite cavity without causing structural collapse of the zeolite. Surprisingly, the chabazites produced by the process of the invention reach their ultimate nitrogen adsorbing capacity when heated at significantly lower dehydration temperatures than are required for the dehydration of chabazites having higher Si/Al ratios (see FIG. 1). This renders the chabazites of the invention superior for commercial adsorption processes since lower temperatures and shorter dehydration times can be used.

DETAILED DESCRIPTION OF THE INVENTION

The Product

Figure 2:
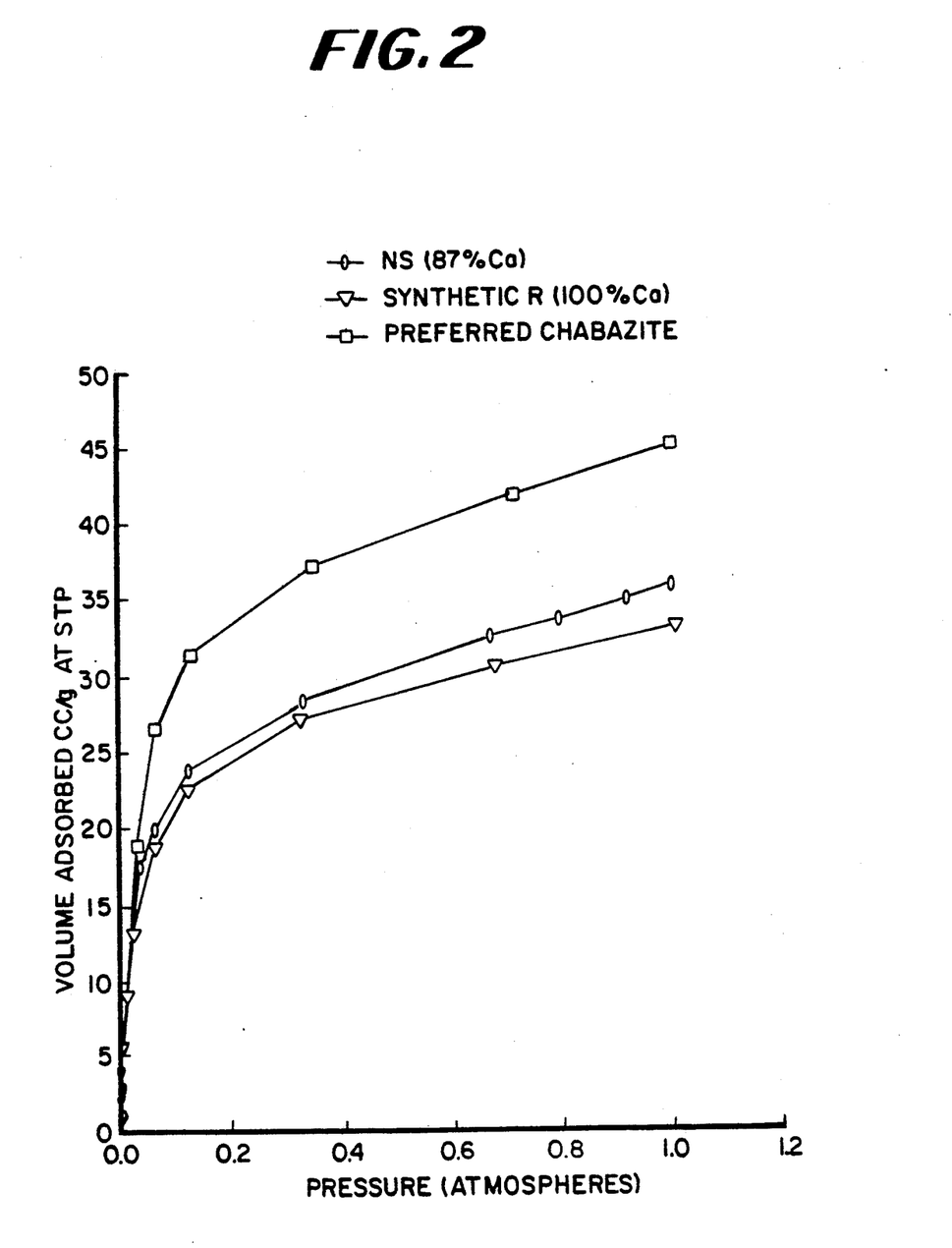
FIG. 2 compares nitrogen isotherms at 30° C. for the best naturally occurring (Nova Scotia) chabazite known, the best prior art synthetic chabazite adsorbent (described in comparative Example A), and a chabazite produced by the process of the invention.

The synthetic chabazites produced by the process of the invention have the chabazite topology and are included in the synthetic zeolites comprehended under the general IUPAC structure code of chabazite (CHA). They have a framework Si/Al ratio of from about 1.8 to about 2.3, preferably 2, and demonstrate improved adsorption properties over any other zeolite, including other compositions of chabazite, for weakly interacting adsorbates such as nitrogen (see FIG. 2). Heretofore, we thought that the best chabazite for scavenging weakly interacting adsorbates would depend only on the number of calcium ions and hence a chabazite with an Si/Al ratio of 1 would afford the highest capacity. Unexpectedly, it has been found that the number of adsorption sites and, consequently, the adsorption capacity, varies systematically with composition. Both the framework Si/Al ratio and cation siting and distribution in the zeolite were found to influence the nitrogen adsorption properties of the chabazite.

Figure 3:
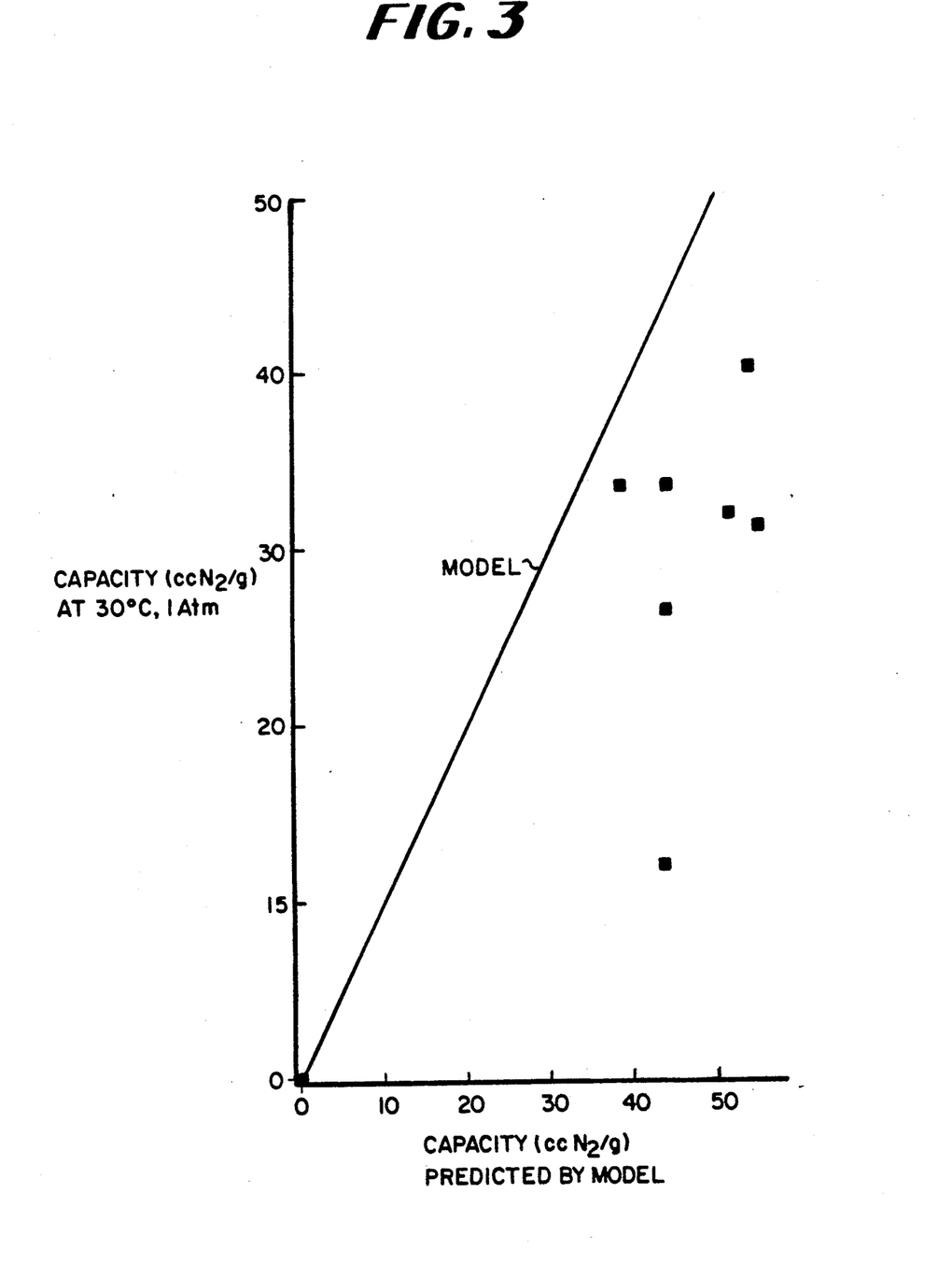
FIG. 3 correlates the actual nitrogen capacity of chabazite-type zeolites to that predicted based solely on cation siting measured at 30° C. 1 atm.

Initial attempts to correlate adsorptive capacity with composition revealed that there is a much larger increase in the adsorptive capacity than can be explained by cation content. As Si/Al ratios were decreased from 4 to 2, the calcium of the zeolite increased by 67% while the adsorptive capacity increased by 350%. Increasing the cation content from 1.2 to 2 ions per unit cell generates many more adsorption sites than would be expected if each cation adsorbs only one nitrogen molecule. Assuming that when there are one or two cations in position II (located near the center of a 6-ring in the large cavity) of chabazite, Mortier, et al. *Mat. Res. Bull.*, 12, 97 (1977) one nitrogen molecule sorbs per calcium ion in site II, and that when a third cation is present the two adsorption sites at position II are destroyed due to pore blockage, the sorption capacity can be predicted as a function of composition. Accordingly, the dependence of the nitrogen capacity of the chabazite-type zeolites on the framework composition should be given by the straight line in FIG. 3. The experimental data plotted in FIG. 3 are all lower than the predicted values and show no apparent correlation between the predicted and experimental values. Apparently, the divalent cation content alone does not determine the adsorptive capacity of a chabazite adsorbent. The cation distribution and siting through the framework are also key structural parameters.

Figure 4:
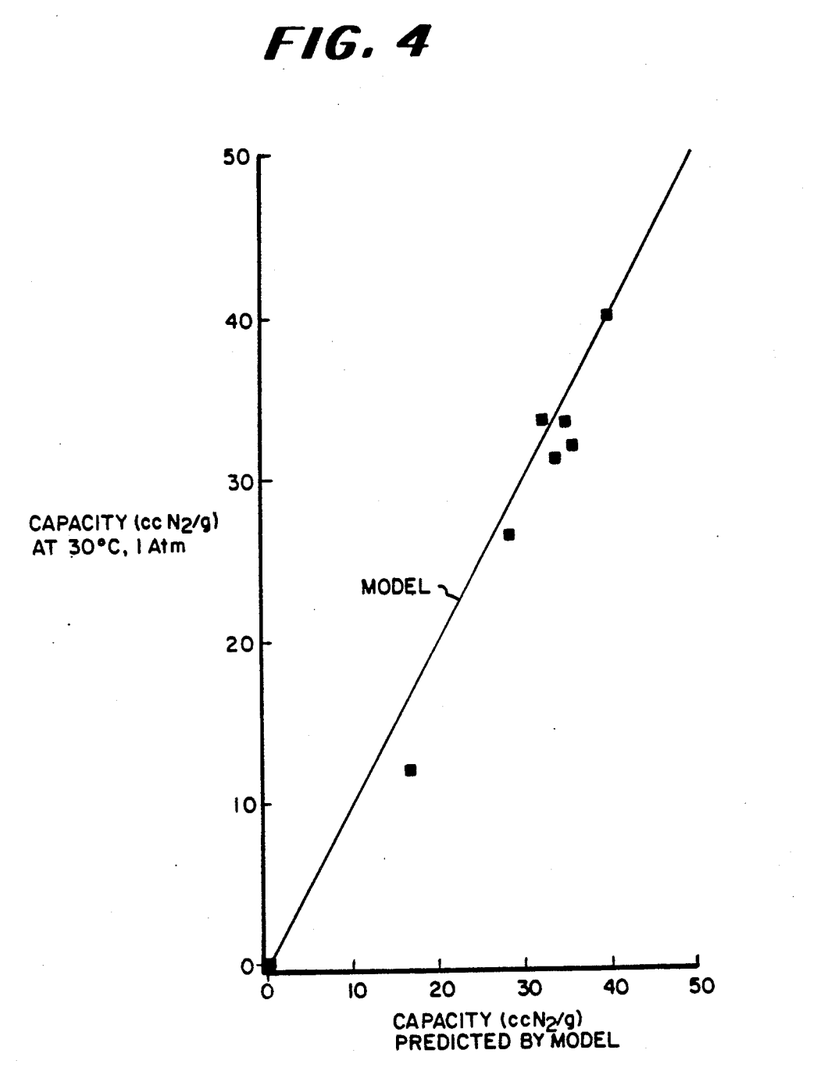
FIG. 4 correlates the actual nitrogen capacity of chabazite-type zeolites to that predicted based on both cation siting and aluminum distribution measured at 30° C. 1 atm.

Using solid state $^{29}$Si NMR (nuclear magnetic resonance) data, it is possible to determine the relative amount of silicon in each of the five chemically distinct environments, Si(nAl), where n denotes the number of aluminum atoms next nearest each silicon and can be 0-4. Since the divalent cations compensate for the negative charges associated with aluminum atoms in the framework structure, on the average, two divalent cations will be associated with each Si(4Al), 3/2 with a Si(3Al), one with each Si(2Al), and ½ with each Si(1Al) site. It has been found that only divalent cations associated with Si(2Al) and Si(1Al) sites adsorb nitrogen. When the values predicted for nitrogen adsorption using the siting hypothesis are scaled to reflect that only the fraction of cations associated with Si(2Al) and Si(1Al) sites contribute to the capacity of chabazite adsorbents, the predicted versus experimental values fall on a straight line as shown in FIG. 4. This shows that one nitrogen molecule is adsorbed per divalent cation accessible by siting and distribution requirements.

The fraction of cations accessible by distribution requirements, $f_d$, can be calculated from NMR data using the formula:

$$f_d = \frac{R}{2}\left(\text{Si(2Al)} + \frac{\text{Si(1Al)}}{2}\right)$$

where R is Si/Al. The fraction of cations accessible by siting requirements, $f_s$, is given by the formulae:

$f_s = 0$ for $R \geq 5$

$f_s = (5-R)/3$ for $R = 2-5$.

$f_s = R - 1$ for $R = 1-2$.

Accordingly, a Si/Al ratio ranging from 1.8 to 2.3 with siting ($f_s$) and distribution ($f_d$) ranging from 7.0 to 1 and 0.62 to 1, respectively, will provide unexpected improvements over prior chabazites. Since a Si/Al ratio of 2 provides the highest adsorption capacity, that ratio is preferred.

The adsorptive capacity of chabazites of the invention in moles/g is given by the expression: $C = f_s f_d N$, where N is the number of moles of divalent cations per gram of adsorbent. For divalent cations of suitable size to occupy either site I or II, $N = \frac{1}{2}(60.08 R + A.W./2 + 58.98)$ where A.W. is the atomic weight of the divalent ion. For calcium chabazite $N = \frac{1}{2}(60.08 R + 79.02)$. The volumetric adsorptive capacity expressed at STP as cc $N_2$/g is designated as $C_v$.

Preferred divalent cation-containing chabazites of the invention have compositions represented by the formula $M_{x/2}{}^{2+}[(SiO_2)_{12-x}]$ where $x = 3.24 - 4.28$ and $M^{2+}$ is a divalent cation.

The unique chabazites produced by the process of the invention require significantly lower dehydration temperatures than prior materials and have enhanced adsorption properties which make them more efficient in adsorption beds and give them longer onstream capability before regeneration is required. The reason the synthetic chabazites produced by the invention can achieve full capacity at much lower dehydration temperatures is not fully understood. For partially dehydrated chabazites, the chabazites produced by the process of the invention having a Si/Al ratio of 1.8 to 2.3 and the siting and distribution parameters outlined above will have more dehydrated/dehydroxylated cations accessible to nitrogen and, hence, a higher nitrogen adsorbing capacity than more siliceous products.

Surprisingly, it has been found that the template concentration of the prior art causes the formation of contaminant phases in chabazite product when scaled up and produces poor adsorbents. While the function of the TMA template appears to be to enhance the kinetics of crystallization of chabazite from the gel, consuming the gel before other contaminant phases begin to crystallize, too much TMA apparently templates the formation of erionite and/or Zeolite EAB. These contaminants have poor nitrogen adsorption and severely lower the overall adsorption properties of the mixed phase material. Unique chabazites are produced by the process of the invention in which TMA is present only in token quantities compared to amounts previously employed.

The calcium form of the synthetic chabazites produced by the process of the invention should be particularly superior to any previously available chabazites in a process for the selective adsorption of one or more minor constituents from a bulk gas stream as disclosed, for example, in U.S. Pat. No. 4,732,584, the disclosure of which is incorporated herein by reference.

The Synthetic Process

Because the instant process provides good yields, good product quality, short crystallization times and convenient scale-up without the introduction of contaminant phases, it is economically attractive and relieves industry dependence on naturally-occurring chabazites.

In the process, a gel is prepared by mixing an alumina source, sodium hydroxide, potassium hydroxide, a TMA reagent, and a silica source.

The alkali metal hydroxides are used in the range: $([Na_2O]+[K_2O])/[SiO_2]=0.4-0.6$, preferably $0.5-0.6$. Lower values tend to result in the formation of offretite-like phases, while higher values tend to result in the formation of phillipsite-like phases.

The amount of TMA regent used ranges from about 0.08 to about 0.0001 $(TMA)_2O:Al_2O_3$, preferably 0.08 to about 0.0003, most preferably 0.08 to 0.0006. The TMA can be introduced as any suitable salt, hydroxide, and/or hydrate thereof, herein referred to as TMA reagent. Some suitable TMA reagents include TMA-chloride, bromide, iodide, hydroxide and the like and mixtures thereof.

Any of the sources of silica used in zeolite synthesis can be used as the silica source of the invention including fumed silica, silica sol, alkoxides of silicon, alkali metal silicates, silicic acid, solid amorphous precipitated silica or silica in any other suitable form as well as mixtures of any of them. Chabazite is obtained as the main product when colloidal silica or precipitated silica gel is used and is the only product when colloidal silica is employed. Colloidal silica (sol) is, thereof, preferred. Some suitable silica reagents which may be used include, for example, precipitated silica (Fluka), silica sol (Ludox, Nalco) and the like, and mixtures thereof.

Alumina may be supplied to the mixture as colloidal alumina, an aluminum alkoxide, pseudoboehmite, aluminum salts, and any other suitable sources used in zeolite synthesis. Some suitable reagents include, for example, aluminum trichloride, aluminum hydroxides, sodium aluminate, and the like and mixtures thereof.

In general, the gel compositions of the invention contain the alumina source, sodium hydroxide, potassium hydroxide, tetramethylammonium reagent and silica source mixed in the proportions: a $Na_2O$:b $K_2O$:c $TMA_2O$:d $SiO_2$:$Al_2O_3$: e $H_2O$ in which $(a+b)/d=0.4$ to 0.6, $c=0.08$ to 0.0001, $d=4$ to 22, and $e=50$ to 1000. A preferred composition has the proportions: $(a+b)/d=0.4$ to 0.6, $c=0.04$, $d=7$, and $e=79$. A preferred gel composition which maximizes the yield of pure synthetic chabazite product is 0.04 $(TMA)_2O$:2.67 $Na_2O$:0.88 $K_2O$:7 $SiO_2$:$Al_2O_3$:110 $H_2O$. Higher yields of impure product may be produced by further reducing the $SiO_2/Al_2O_3$ ratio below about 7. A preferred gel composition which minimizes the amount of TMA reagent used is 0.0006 $(TMA)_2O$:6.67 $Na_2O$:2.2 $K_2O$:17.5 $SiO_2$:$Al_2O_3$:276 $H_2O$.

Lower amounts of TMA reagent can be used to maximize yield of pure product. It is to be understood that, although lower TMA concentrations produce TMA-chabazite as the major product, the probability of a contaminant phase crystallizing from these preparations increases. For example, a 0.000313 $(TMA)_2O/Al_2O_3$ will still yield chabazite as a major (greater than 50%) phase although other zeolites are produced.

The gel is crystallized at a temperature in the range of 25° to 150° C. for at least one hour or for as long as may be desired. Preferably, crystallization is carried out by heating the gel at a temperature ranging from about 85° to 100° C. for a period ranging from about twelve to about ninety-six hours.

Although stirred syntheses can yield synthetic chabazite as the major product, it is preferred that the gel is not agitated during crystallization since that often leads to the formation of undesirable phillipsite product.

After crystallization is completed, the product can, if desired, be isolated by any suitable method, washed, preferably with water, and dried, preferably air dried, before being ion exchanged into the divalent form using any suitable method. Any exchange that will replace at least a majority (greater than 50%) of monovalent ions with divalent ions, preferably calcium and/or strontium, can be used. Some suitable salts that can be used to effectuate the exchange include alkaline earth metal salts such as salts of magnesium, calcium, strontium, barium; and the like along with the corresponding chlorides, nitrates, acetates, and sulfates, for example calcium chloride, calcium nitrate, calcium acetate, corresponding alkaline earth metal salts and the like and mixtures thereof. For best adsorbing/purification properties, the higher the exchange level of polyvalent cation for monovalent cation, the better.

Dehydration of the polyvalent cation-containing chabazite to a level of optimum performance can be carried out by any method which will remove the water from the zeolite cavity, including water surrounding the cations, without causing the collapse of the zeolite structure. To achieve this in a practical manner, the chabazite should be maintained at temperature in the range of 200°–400° C. under any conditions suitable to lower the water content of the zeolite to less than about 1.5 weight % without causing structural damage to the zeolite.

The invention is further illustrated but is not intended to be limited by the following examples in which all parts and percentages are by weight unless otherwise indicated. In the examples, nitrogen and argon isotherms are measured at 30° C. from 0 to 1 atmospheres using a volumetric adsorption apparatus. Prior to the uptake measurements, each adsorbent is first thoroughly dehydrated for 16 to 18 hours to a final temperature of 400° C. unless otherwise indicated. In all cases the samples are heated at 1° to 2° C. per minute up to the desired temperature while maintaining a pressure of less than $10^{-5}$ Torr in the system. All adsorption uptakes are measured at 30° C. and 1 atmosphere pressure and are reported as ccSTP/g.

For the examples given below, aluminum hydroxide and potassium hydroxide used have variable water content. Aluminum hydroxide was typically 50–65 wt % $Al_2O_3$, potassium hydroxide was typically 87 wt % KOH. In the examples, the gel compositions reported account for the actual dry weight of $Al_2O_3$ and KOH used.

EXAMPLE 1

Aluminum hydroxide hydrate (12.12 g), sodium hydroxide (32.06 g), potassium hydroxide (87 wt % KOH 17.3 g), and tetramethylammonium hydroxide pentahydrate (TMA-OH) (3.59 g) were dissolved in 138.5 g water. The solution was added to 209.75 g of a 30 wt % silica sol with stirring. The resulting thick gel (composition 0.16 ($TMA_2O$:6.67 $Na_2O$:2.2 $K_2O$:17.5 $SiO_2$:$Al_2O_3$:276 $H_2O$) which formed is stirred for 15 minutes, was placed in a sealed Teflon-lined reactor, heated to 85° C., and maintained at that temperature for four days. The product was separated by filtration, washed with water, and air dried. The product has an X-ray powder diffraction pattern characterized by the following data in which $I/I_0$ is the relative intensity and "d" is the interplanar spacing.

| 2Θ   | d(A) | 100 × $I/I_0$ |
|------|------|---------------|
| 7.5  | 11.7 | 7   |
| 9.5  | 9.3  | 18  |
| 12.9 | 6.87 | 30  |
| 15.9 | 5.56 | 7   |
| 17.7 | 5.01 | 30  |
| 20.5 | 4.33 | 43  |
| 22.4 | 3.97 | 16  |
| 23.1 | 3.85 | 9   |
| 24.8 | 3.59 | 5   |
| 25.9 | 3.44 | 28  |
| 27.5 | 3.23 | 10  |
| 28.1 | 3.18 | 12  |
| 28.6 | 3.11 | 5   |
| 30.5 | 2.93 | 100 |
| 34.5 | 2.60 | 38  |
| 38.1 | 2.36 | 4   |
| 39.2 | 2.29 | 17  |
| 43.2 | 2.09 | 28  |
| 46.6 | 1.95 | 4   |
| 47.6 | 1.91 | 9   |
| 48.8 | 1.87 | 6   |
| 50.4 | 1.81 | 40  |
| 51.4 | 1.77 | 4   |
| 53.1 | 1.72 | 32  |

While these X-ray data indicate that the product is essentially pure synthetic chabazite, the procedure provides impure product when scaled-up (see Example 4). A portion of this product (6 g) was refluxed in 100 ml of a 1M $CaCl_2$ solution for two hours, filtered, and washed with 250 ml water. The procedure was repeated three times. The calcium exchange level, determined by X-ray fluorescent spectroscopy, was about 92% and the nitrogen capacity of the product was 31.7 ccSTP/g.

EXAMPLE 2

Sodium hydroxide (13.39 g) and potassium hydroxide (7.12 g) were dissolved in 40 g water (solution I). Sililic acid (26.4 g) was suspended in 50 g water and 1.5 g of tetramethylammonium hydroxide pentahydrate was added (Solution II). A portion of Solution I was added to Solution II until the silica dissolved (about 30 ml). Aluminum hydroxide (5.08 g) was added to 29.3 g water and the remaining amount of Solution I was added to the aluminum hydroxide, causing dissolution of the aluminum hydroxide. The aluminum hydroxide solution was then added to the silica solution and the resulting solution stirred for about five minutes. A thick gel resulted which had the composition 0.16 ($TMA$)$_2O$:6.67 $Na_2O$:2.2 $K_2O$:17.5 $SiO_2$:$Al_2O_3$:276 $H_2O$. The gel was stirred for about fifteen minutes and then heated in a Teflon coated vessel at 85° C. for about 24 hours. The product has an X-ray powder diffraction pattern characterized by the following data where $I/I_0$ is the relative intensity and "d" is the interplanar spacing:

| 2Θ   | d(A) | 100 × $I/I_0$ |
|------|------|---------------|
| 7.5  | 11.7 | 4   |
| 9.5  | 9.3  | 14  |
| 12.5 | 7.08 | 8   |
| 12.9 | 6.83 | 26  |
| 15.9 | 5.55 | 7   |
| 16.6 | 5.33 | 6   |
| 17.7 | 5.03 | 33  |
| 20.5 | 4.31 | 40  |
| 21.8 | 4.07 | 13  |
| 22.4 | 3.96 | 16  |
| 23.0 | 3.86 | 3   |
| 24.8 | 3.58 | 4   |
| 25.9 | 3.44 | 25  |
| 27.5 | 3.24 | 17  |
| 28.1 | 3.18 | 36  |
| 28.6 | 3.11 | 19  |
| 30.5 | 2.93 | 100 |
| 33.4 | 2.68 | 1   |
| 34.5 | 2.60 | 33  |
| 38.0 | 2.37 | 5   |
| 39.3 | 2.29 | 21  |
| 41.7 | 2.16 | 3   |
| 43.3 | 2.09 | 26  |
| 46.4 | 1.95 | 1   |
| 47.6 | 1.91 | 8   |
| 48.7 | 1.87 | 4   |
| 50.4 | 1.81 | 39  |
| 51.5 | 1.77 | 3   |
| 53.2 | 1.72 | 36  |

On the basis of these X-ray data, the product was estimated to be 87% synthetic chabazite and 13% phillipsite-type phase (ZK-19). This example demonstrates that silica does not provide as pure a product as colloidal silica or silica sol.

EXAMPLE 3

Another procedure was carried out using precipitated silica and following the method described by Tsitsishvili, et al. in *Soobshcheniya akademii nauk Gurzinoskoi SSR*, 97. No. 3, 621 (1980). A gel having the composition 9.4 $Na_2O$:2.75 $K_2O$:1.3 ($TMA$)$_2O$:21.07 $SiO_2$:$Al_2O_3$:470 $H_2O$ was prepared by the procedure of Example 2, using NaCl and KCl to adjust the alkali metal concentration. The gel was stirred for two hours and then heated at 85° C. for three days. The product had an X-ray powder diffraction pattern characterized by the following data wherein $I/I_0$ is the relative intensity and "d" is the interplanar spacing:

| 2Θ | d(A) | 100 × I/I₀ |
| --- | --- | --- |
| 7.5 | 11.8 | 4 |
| 9.5 | 9.3 | 15 |
| 10.9 | 8.1 | 1 |
| 12.5 | 7.05 | 17 |
| 12.9 | 6.83 | 28 |
| 16.0 | 5.56 | 6 |
| 16.6 | 5.32 | 7 |
| 17.6 | 5.02 | 33 |
| 20.6 | 4.31 | 41 |
| 22.4 | 3.96 | 15 |
| 23.0 | 3.86 | 4 |
| 24.8 | 3.59 | 8 |
| 25.9 | 3.43 | 29 |
| 27.5 | 3.24 | 18 |
| 28.1 | 3.17 | 43 |
| 30.5 | 2.93 | 100 |
| 33.5 | 2.67 | 10 |
| 34.5 | 2.60 | 31 |
| 38.0 | 2.36 | 4 |
| 39.3 | 2.29 | 15 |
| 41.7 | 2.16 | 3 |
| 42.4 | 2.13 | 4 |
| 43.3 | 2.09 | 28 |
| 4.0 | 2.05 | 4 |
| 46.3 | 1.96 | 4 |
| 47.6 | 1.91 | 9 |
| 48.6 | 1.87 | 5 |
| 50.4 | 1.81 | 37 |
| 51.6 | 1.77 | 7 |
| 53.2 | 1.72 | 32 |

These X-ray data indicate that the product is 85% TMA-chabazite and 15% Phillipsite-type phase (ZK-19). After an ion-exchange treatment as described in Example 1, the calcium form of the product had a nitrogen adsorptive capacity of about 25 ccSTP/g. The reduced adsorptive capacity compared to that of Example 1 is due to the presence of the ZK-19 phase. Accordingly, substantially pure TMA-chabazite providing a superior adsorbent is produced when colloidal silica is substituted for silica gel.

EXAMPLE 4

The procedure of Example 1 was scaled-up using 60.6 g aluminum hydroxide, 160.32 g NaOH, 86.51 g KOH, 17.94 g TMA-OH, 676 g water, and 1051.8 g of the silica sol of Example 1 to provide a gel composition of 0.16 (TMA$_2$O): 6.67 Na$_2$O: 2.2 K$_2$O: 17.5 SiO$_2$:Al$_2$O$_3$: 276 H$_2$O. The gel was crystallized for three days at 95° C. The product had an X-ray powder diffraction pattern characterized by the following data wherein I/I$_0$ is the relative intensity and "d" is the interplanar spacing:

| 2Θ | d(A) | 100 × I/I₀ |
| --- | --- | --- |
| 7.8 | 11.4 | 10 |
| 9.5 | 9.3 | 13 |
| 11.8 | 7.5 | 1 |
| 12.9 | 6.85 | 20 |
| 13.4 | 6.61 | 5 |
| 14.1 | 6.25 | 1 |
| 16.1 | 5.51 | 7 |
| 17.7 | 5.01 | 27 |
| 19.4 | 4.56 | 7 |
| 20.5 | 4.33 | 42 |
| 22.4 | 3.96 | 14 |
| 23.0 | 3.87 | 11 |
| 23.6 | 3.76 | 20 |
| 24.9 | 3.58 | 21 |
| 25.9 | 3.43 | 27 |
| 28.6 | 3.12 | 7 |
| 30.5 | 2.92 | 100 |
| 31.4 | 2.84 | 45 |
| 33.4 | 2.68 | 7 |
| 34.4 | 2.60 | 38 |
| 35.8 | 2.51 | 6 |
| 39.2 | 2.30 | 18 |
| 42.4 | 2.13 | 5 |
| 43.2 | 2.09 | 26 |
| 47.5 | 1.91 | 7 |
| 48.1 | 1.89 | 8 |
| 50.3 | 1.81 | 37 |
| 51.4 | 1.78 | 7 |
| 53.1 | 1.72 | 32 |

These X-ray data indicate that the product is 75% synthetic chabazite and 25% erionite or EAB type phase. After ion exchange to the calcium form as described in Example 1, the nitrogen capacity of the product was 16.9 ccSTP/g. Accordingly, the scale-up of the procedure of Example 1 provide impure product with inferior adsorptive properties.

EXAMPLE 5

The procedure of Example 4 was followed using 60.6 g of aluminum hydroxide, 160.32 g of sodium hydroxide, 87.0 g of potassium hydroxide, 1051.8 g of silica, 674 g of water, and 0.56 g of tetramethylammonium hydroxide pentahydrate were used to give a gel composition of 0.005 (TMA)$_2$O: 6.67 Na$_2$O: 2.2 K$_2$O: 17.5 SiO$_2$:Al$_2$O$_3$: 276 H$_2$O. The product had an X-ray powder diffraction pattern characterized by the following data wherein I/I$_0$ is the relative intensity and "d" is the interplanar spacing:

| 2Θ | d(A) | 100 × I/I₀ |
| --- | --- | --- |
| 7.5 | 11.7 | 3 |
| 9.5 | 9.3 | 16 |
| 12.87 | 6.87 | 23 |
| 16.0 | 5.52 | 7 |
| 17.7 | 5.01 | 29 |
| 20.6 | 4.31 | 38 |
| 22.4 | 3.97 | 11 |
| 23.0 | 3.87 | 7 |
| 24.8 | 3.59 | 7 |
| 25.9 | 3.44 | 31 |
| 27.5 | 3.24 | 8 |
| 28.0 | 3.18 | 14 |
| 28.6 | 3.11 | 9 |
| 30.5 | 2.93 | 100 |
| 34.4 | 2.60 | 40 |
| 35.8 | 2.51 | 2 |
| 39.2 | 2.30 | 17 |
| 41.7 | 2.16 | 3 |
| 42.4 | 2.13 | 3 |
| 43.2 | 2.09 | 25 |
| 44.7 | 2.02 | 3 |
| 47.5 | 1.91 | 7 |
| 48.7 | 1.87 | 4 |
| 50.3 | 1.87 | 37 |
| 51.5 | 1.77 | 3 |
| 53.1 | 1.72 | 34 |

These X-ray data indicate that the product is essentially pure synthetic chabazite. This example shows the importance of limiting the amount of TMAOH to produce an essentially pure chabazite phase on a larger scale. After exchange to the calcium form as described in Example 1, the calcium-exchange level is about 92%, the nitrogen capacity is about 40 ccSTP/g, the SiAl is 2.1, the $f_s$ is 0.97 and the $f_d$ is 0.74 for the product. Accordingly, pure synthetic chabazite was produced in scaled-up production batches to provide a superior adsorbent to other known chabazite adsorbents (see FIG. 2).

EXAMPLE 6

A gel composition of 0.16 $(TMA)_2O$ : 6.67 $Na_2O$: 2.2 $K_2O$: 17.5 $SiO_2:Al_2O_3$: 276 $H_2O$ prepared as described in Example 1 was heated at 85° C. for twenty-four hours. The X-ray powder diffraction pattern for the product was substantially identical to the pattern for the product of Example 1. This demonstrates that crystallization conditions of 85° C. for one day are sufficient to convert the gel to TMA-chabazite.

EXAMPLE 7

The gel composition of Example 6 excluding the TMA was treated as described in Example 6. The product was an amorphous solid. This demonstrates that TMA-OH is required to form TMA-chabazite under the crystallization conditions of Example 6.

EXAMPLE 8

Example 7 was repeated and the gel is heated at 85° C. for four days. The product had an X-ray powder diffraction pattern characterized by the following data wherein $I/I_0$ is the relative intensity and "d" is the interplanar spacing:

| 2      | d(A) | 100 × $I/I_0$ |
|--------|------|---------------|
| 9.4    | 9.3  | 3             |
| 10.89  | 8.12 | 5             |
| 12.49  | 7.08 | 35            |
| 12.91  | 6.85 | 7             |
| 13.95  | 6.34 | 1             |
| 16.56  | 5.34 | 13            |
| 17.60  | 5.04 | 22            |
| 17.88  | 4.96 | 26            |
| 20.65  | 4.30 | 17            |
| 21.87  | 4.06 | 19            |
| 22.39  | 3.97 | 7             |
| 24.77  | 3.59 | 5             |
| 25.87  | 3.44 | 11            |
| 27.4   | 3.26 | 39            |
| 28.0   | 3.18 | 100           |
| 30.4   | 2.94 | 48            |
| 32.6   | 2.74 | 14            |
| 33.4   | 2.68 | 29            |
| 37.6   | 2.39 | 4             |
| 39.2   | 2.29 | 4             |
| 40.1   | 2.25 | 3             |
| 41.8   | 2.16 | 1             |
| 43.3   | 2.09 | 7             |
| 44.1   | 1.97 | 7             |
| 46.1   | 1.97 | 6             |
| 47.6   | 1.91 | 3             |
| 48.4   | 1.88 | 4             |
| 50.4   | 1.81 | 12            |
| 51.5   | 1.77 | 15            |
| 53.2   | 1.72 | 22            |

These data indicate that the product is 30% synthetic chabazite and 70% phillipsite-type phase (ZK-19). This example demonstrates the effect of TMA-OH on product purity.

EXAMPLE 9

The procedure of Example 1 was carried out using only enough TMA-OH to provide a gel composition of 0.000625 $(TMA)_2O$: 6.67$Na_2O$: 2.2 $K_2O$: 17.5 $SiO_2:Al_2O_3$: 276 $H_2O$. The X-ray powder diffraction pattern of the product is substantially identical to the pattern of the product of Example 1. This example illustrates the use of the minimum concentration needed to provide pure synthetic chabazite in accordance with the invention. Lower quantities of $[TMA]_2O$ in the gel composition provided ZK-19-containing chabazite product.

EXAMPLE 10

Table 1 lists data for a number of gel compositions prepared as described in Example 1. By reducing the $SiO_2/Al_2O_3$ ratio from 17.5 to 7, reactor productivity was increased by 250% and substantially pure TMA-chabazite is produced. The nitrogen capacity data given in Table 1 show that the calcium exchanged products formed from gel compositions having $SiO_2/Al_2O_3$ ratios in the range of 17.5 to 7 have excellent adsorptive capacity for nitrogen.

TABLE 1

| Gel Composition | | | | | | Temp | Time | Wt Product[a] | Product | | $N_2$(ccSTP/g) |
|---|---|---|---|---|---|---|---|---|---|---|---|
| $Na_2O$ | $K_2O$ | $(TMA)_2O$ | $SiO_2$ | $Al_2O_3$ | $H_2O$ | (°C.) | (days) | Wt gel | % CHA | % ZK-19[b] | Capacity |
| 6.67 | 2.26 | 0.005 | 17.5 | 1 | 276 | 95 | 3 | 0.1 | 100 | 0 | 34 |
| 4.72 | 1.61 | 0.12  | 12.5 | 1 | 203 | 95 | 3 | —   | 100 | 0 | 32 |
| 3.40 | 1.16 | 0.16  | 9.0  | 1 | 146 | 95 | 3 | 0.2 | 100 | 0 | 38 |
| 2.67 | 0.89 | 0.04  | 7.0  | 1 | 110 | 95 | 3 | 0.3 | 100 | 0 | 36 |
| 1.91 | 0.65 | 0.16  | 5.0  | 1 | 79  | 85 | 2 | 0.3 | 80  | 20 | 25 |
| 1.53 | 0.52 | 0.16  | 4.0  | 1 | 79  | 85 | 3 | 0.5 | 80  | 20 | — |

[a]Estimates of reactor productivity. Due to variable water content of the products, these values do not correspond to product yields.
[b]Estimated from x-ray powder diffraction data of pure component and mixtures.

EXAMPLE 11

Figure 1:
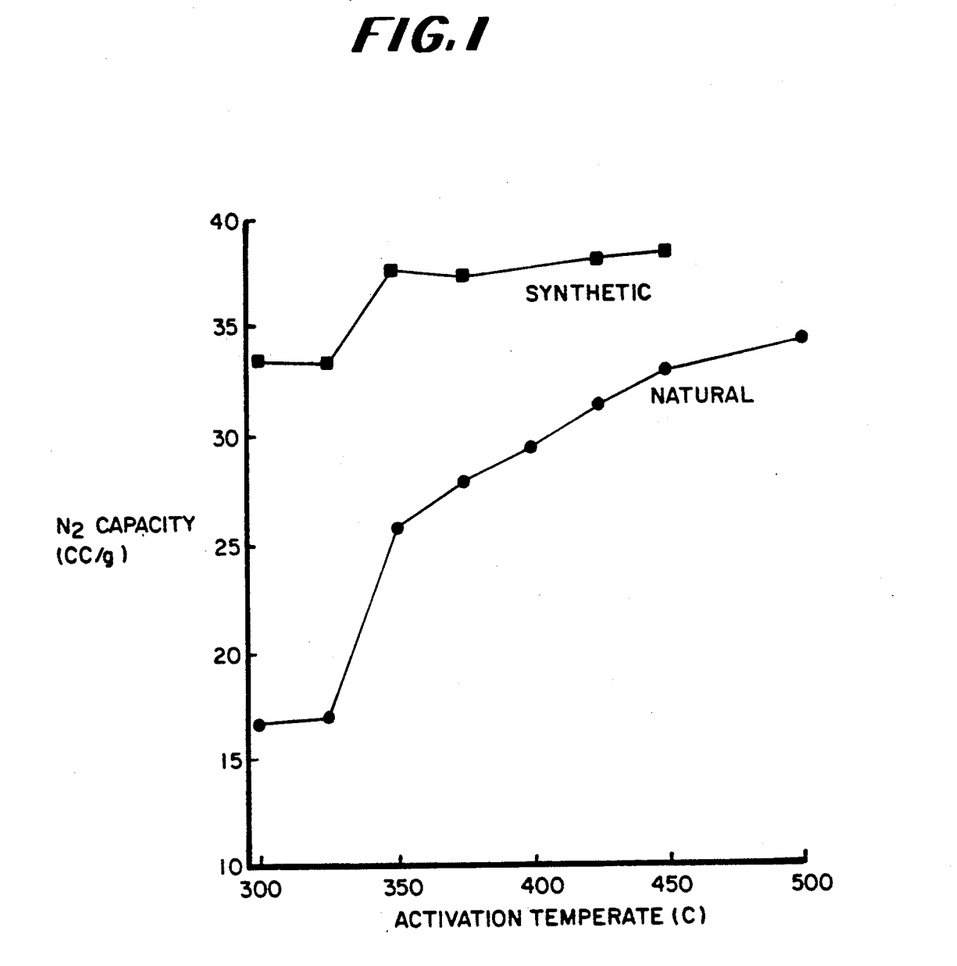
FIG. 1 shows adsorption of nitrogen on chabazites as a function of dehydration temperature at 30° C., 1 atm.

The effect of dehydration temperature on nitrogen adsorption for a siliceous chabazite and the synthetic chabazite of Example 2 is given in FIG. 1. This data shows that synthetic TMA-chabazites reach their ultimate nitrogen adsorbing capacity at significantly lower dehydration temperatures compared to siliceous Nova Scotia (NS) chabazite. The synthetic material reaches essentially full capacity at 350° C. compared to about 500° C. for the natural chabazite. At a commercially practical temperature range of from about 250°–375° C. for dehydration, the chabazites of the invention provide a 33%–100% improvement in nitrogen adsorption over the natural chabazite.

EXAMPLE 12

The chabazite of Example 5 was ion-exchanged into the strontium form from the pure sodium form of the synthetic chabazite. Four exchanges with 1M $SrCl_2$ (0.5 l/10 g) produced a highly strontium exchanged sample.

The following comparative examples illustrate attempts to reproduce the prior art to prepare an acceptable adsorbent on a larger scale, and were all unsuccessful.

COMPARATIVE EXAMPLE A

Chabazites were prepared as described by Milton in British patent No. 841,812 as follows: Aluminum hydroxide (10.3 g) and sodium hydroxide (11.12 g) are dissolved in 86.4 g of water. The solution was added to 46.47 g of colloidal silica (30 wt %), and the gel of composition 2.1 Na$_2$O: 3.5 SiO$_2$:Al$_2$O$_3$: 105 H$_2$O is stirred for 30 minutes, and heated to 100° C. for 16 hours. The product is estimated to be 76% zeolite R, 12% zeolite P, and 12% zeolite Y. The calcium form of the product has nitrogen adsorption capacity of 33.1 cc/g.

COMPARATIVE EXAMPLE B

A gel was prepared by the method of Example A using 103 g aluminum hydroxide, 111.2 g sodium hydroxide, 864 g water, and 464.8 g of 30% silica. A gel of composition 2.1 Na$_2$O: 3.5 SiO$_2$:Al$_2$O$_3$: 105 H$_2$O was crystallized at 90° C. for 16 hours without stirring. The product is 55% zeolite R, 25% zeolite Y, and 20% zeolite P because of temperature gradients that form during crystallization without stirring. This example shows that our best attempt to scale up zeolite R prepartions to the same size as those described in Example 5 of this invention produces impure and inferior adsorbent.

COMPARATIVE EXAMPLE C

A gel was prepared and crystallized by the method of Example A while stirring during the crystallization period. The product was mixture of zeolites Y and P. No zeolite R was recovered.

COMPARATIVE EXAMPLES D-F

Figure 5:
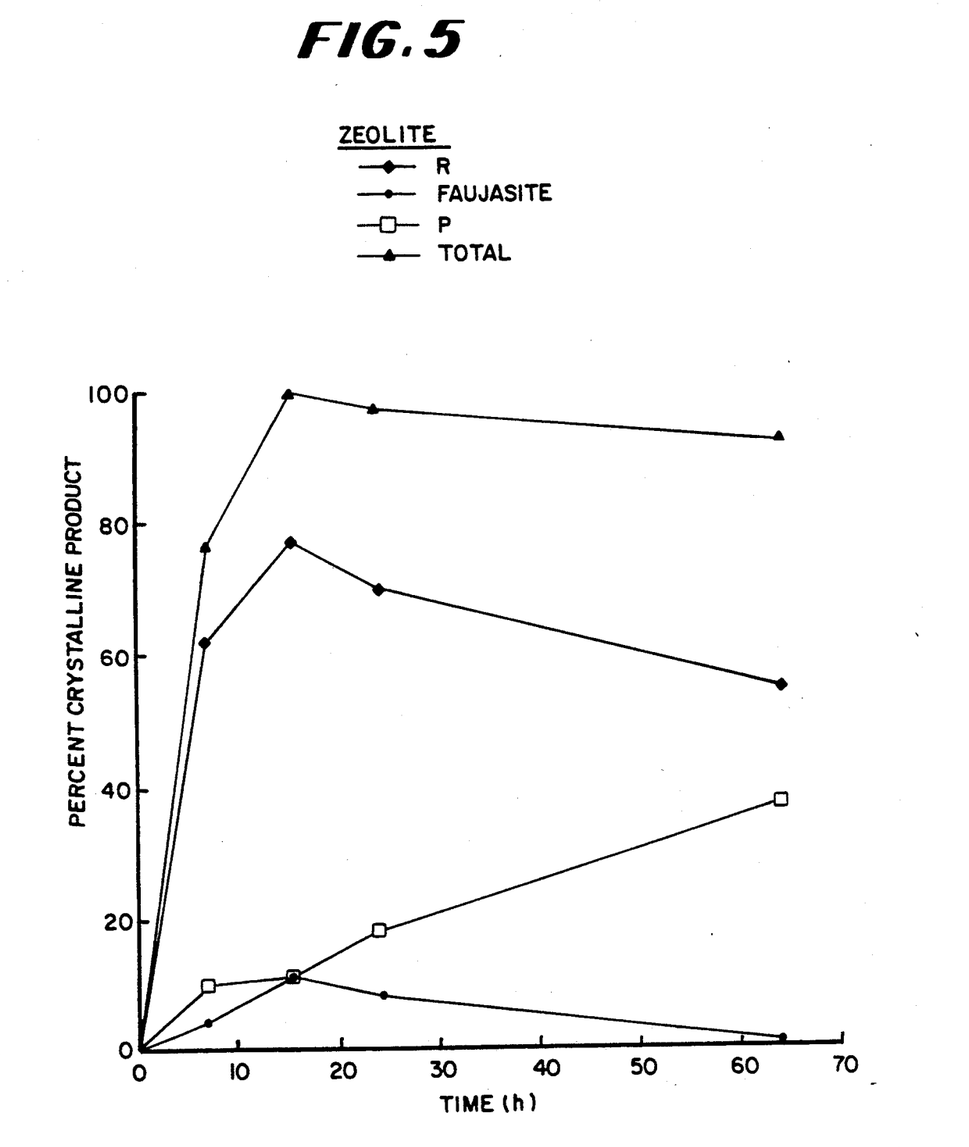
FIG. 5 shows the amount of zeolites P, R, and Faujasite produced from zeolite R preparations as a function of crystallization times.

Gels were prepared by the method described in Example A and crystallized for 8, 24, and 64 hours. FIG. 5 shows that the % zeolite R formed reaches a maximum after 16 hours, and decreases at longer crystallization times as formation of zeolite P increases. Therefore, one cannot simply increase the crystallization time to improve the product purity of zeolite R.

While the Examples illustrate some preferred embodiments of the invention, similar results can be obtained using alternate embodiments suggested herein.

Although the invention has been described in considerable detail in the foregoing, it is to be understood that such detail is solely for the purpose of illustration and that variations may be made without departing from the spirit and scope of the invention except as set forth in the claims.

What is claimed is:

1. A batch process for preparing a synthetic chabazite having a Si/Al ratio of 1.8 to 2.3 which comprises mixing an alumina source, sodium hydroxide, potassium hydroxide, a TMA reagent at a (TMA)$_2$O:Al$_2$O$_3$ ratio of about 0.005, and a silica source to form an aqueous gel, and crystallizing the gel by heating to form the chabazite product, wherein said process is carried out on a scale such that at least 60.6 g of the alumina source is utilized in the process.

2. The process of claim 1 wherein the chabazite product is converted into the divalent form.

3. The process of claim 2 wherein the chabazite product is converted into the composition M$^{2+}$[(SiO$_2$)$_{12-x}$(Al)$_2$)$_x$] where x=3.24–4.28 and M$_{x/2}{}^{2+}$ is the divalent ion.

4. The process of claim 3 wherein the chabazite is converted into the divalent form with an alkaline earth metal cation.

5. The process of claim 4 wherein the alkaline earth metal is a member selected from the group consisting of calcium, strontium, magnesium, barium and mixtures thereof.

6. The process of claim 5 wherein the alkaline earth metal is calcium.

7. The process of claim 5 wherein the alkaline earth metal is strontium.

8. The process of claim 1 wherein the gel is crystallized by heating at a temperature of from about 25° to 150° C. for at least 1 hour.

9. The process of claim 8 wherein the gel is crystallized at a temperature of from about 85° to 100° C. for from about twelve to ninety-six hours.

10. The process of claim 1 wherein the silica source is colloidal silica.

11. The process of claim 1 wherein the alumina source is aluminum hydroxide.

12. The process of claim 1 wherein the TMA reagent is tetramethylammonium hydroxide.

13. The process of claim 1 wherein the sodium and potassium hydroxides are mixed at a ratio to SiO$_2$ of ([Na$_2$O]+[K$_2$O])/SiO$_2$ 0.4 to 0.6.

14. The process of claim 13 wherein the ratio is 0.5 to 0.6.

15. The process of claim 1 wherein the alumina source, sodium hydroxide, potassium hydroxide, tetramethylammonium reagent and silica source are mixed in the proportions: a Na$_2$O:b K$_2$O:c TMA$_2$O:d SiO$_2$:Al$_2$O$_3$:eH$_2$O in which (a+b)/d=0.4 to 0.6, c=[0.08 to 0.0001]0.005, d=4 to 22, and e=50 to 1000.

16. The process of claim 15 wherein the chabazite product is separated from the crystallizing gel, washed, and dried.

17. The process of claim 3 wherein the divalent form of the chabazite is dehydrated by maintaining it at a temperature of about 250° to 400° C. to lower the water content to less than about 1.5%.

18. The product of the process of claim 1.

19. The product of the process of claim 3.

* * * * *